…

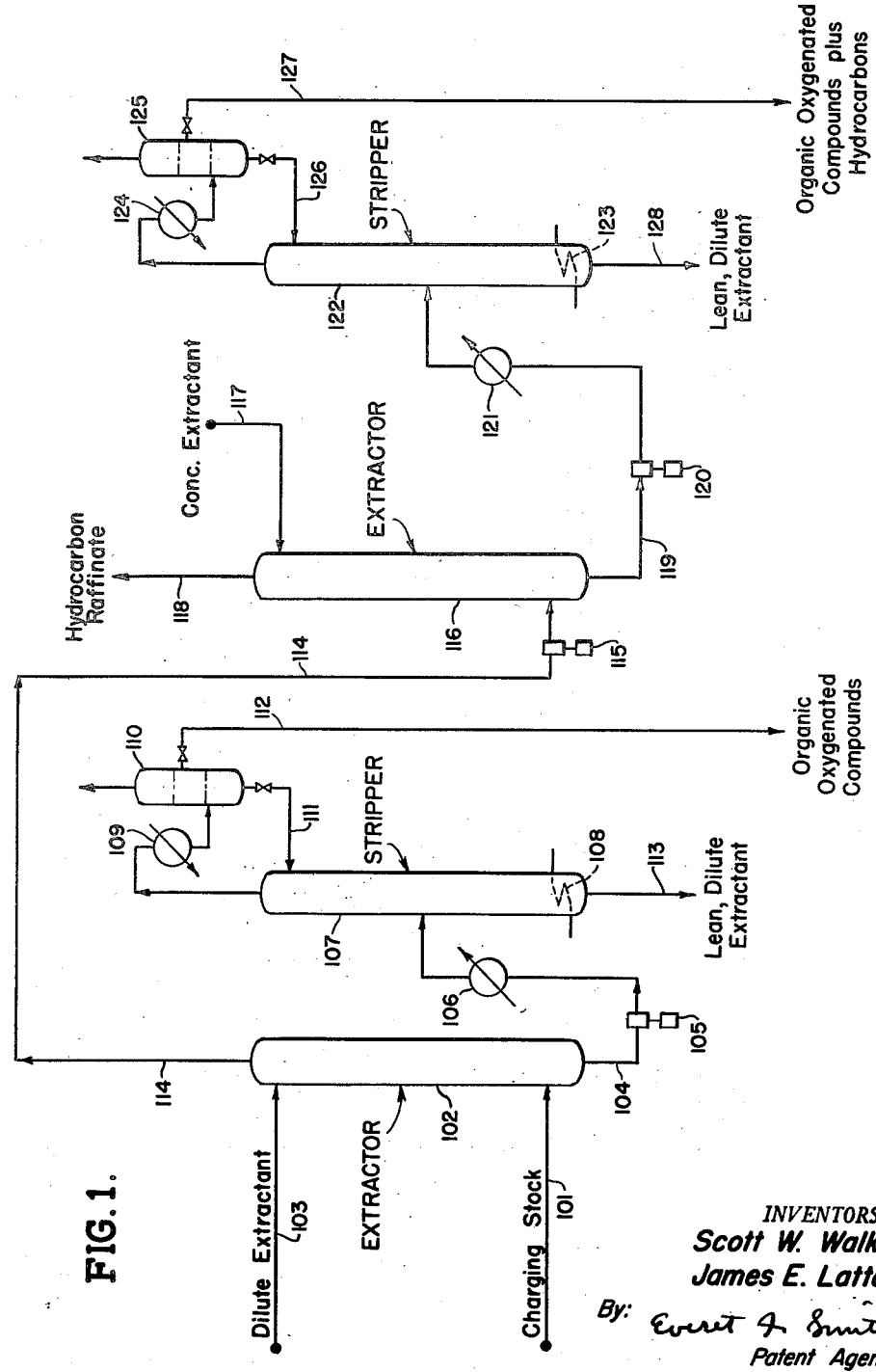

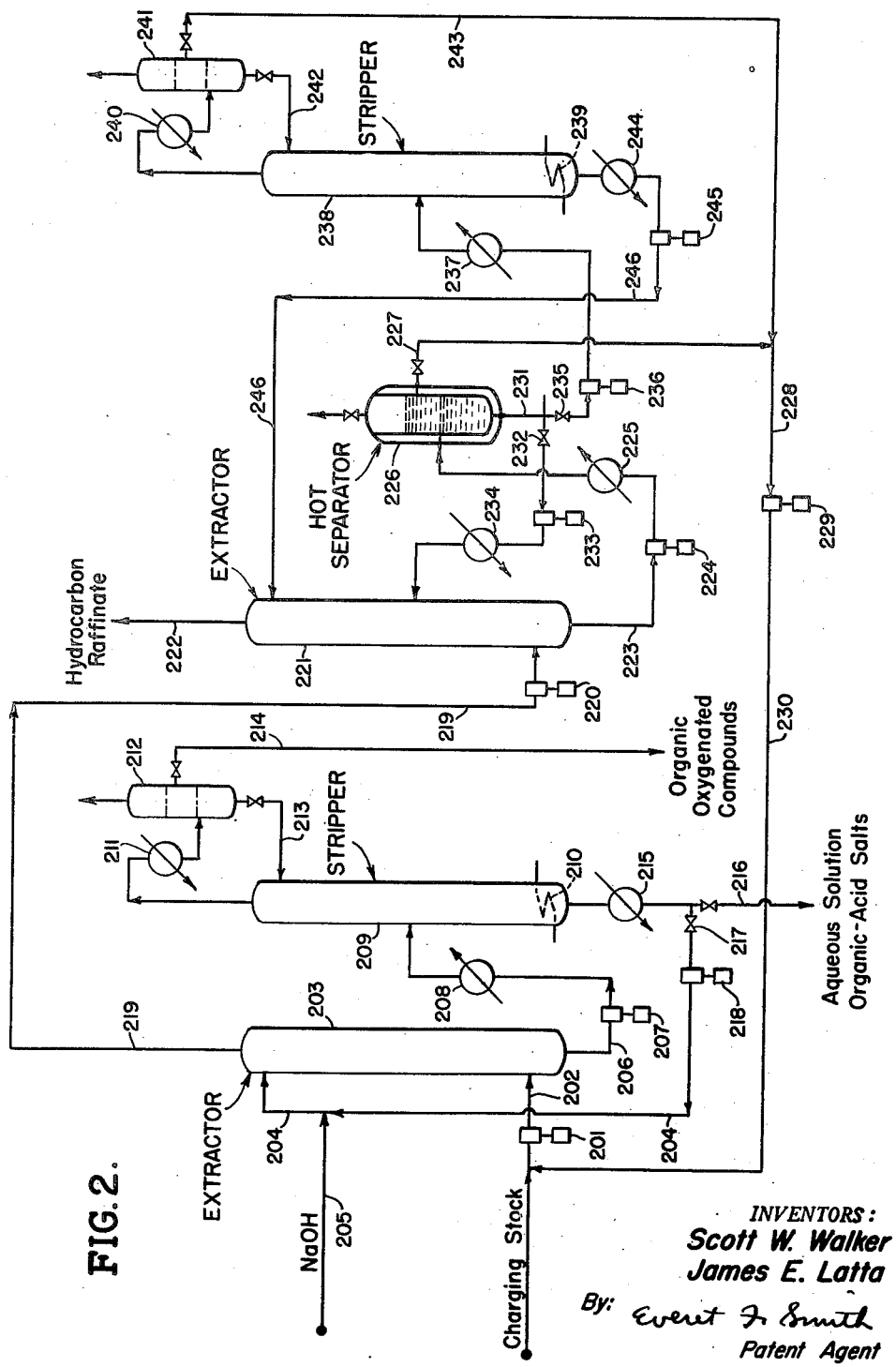

UNITED STATES PATENT OFFICE 2,535,070

SEPARATION OF ORGANIC OXYGENATED COMPOUNDS FROM HYDROCARBONS

Scott W. Walker and James E. Latta, Tulsa, Okla., assignors to Stanolind Oil and Gas Company, Tulsa, Okla., a corporation of Delaware Application August 12, 1948, Serial No. 43,946

8 Claims. (Cl. 260—450)

This invention relates to the separation of organic oxygenated compounds from mixtures thereof with hydrocarbons, and more particularly to a method for segregating, separating, and purifying alcohols, aldehydes, and/or ketones from hydrocarbon solutions.

Our invention is an improvement in the process for separating organic oxygenated compounds from hydrocarbon solutions thereof by extracting the organic oxygenated compounds with an aqueous extractant solution comprising a solubilizer chosen from the group consisting of salts and soaps of organic acids. Our invention is a combination process wherein the charging stock comprising a hydrocarbon and an organic oxygenated compound is contacted successively with aqueous extractant solutions containing low and high concentrations of the defined class of solubilizers. By means of this combination of steps, preferably in conjunction with certain recycle features to be described below, we are able to separate a high proportion of organic oxygenated compounds from a hydrocarbon solution comprised thereof, and to recover an organic oxygenated compound fraction containing a substantially smaller proportion of hydrocarbon contaminants than may be obtained in the prior-art process referred to above.

Our process is broadly applicable to the separation of organic oxygenated compounds from hydrocarbon solutions thereof, however derived. Such solutions are produced in numerous processes, either as primary products or as by-products. For example, mixtures of organic oxygenated compounds and hydrocarbons are obtained as the major reaction products when hydrocarbon liquids and gases are oxidized by various methods, when olefins are reacted with carbon monoxide and hydrogen in the Oxo process, and when carbon monoxide is hydrogenated by a variety of processes, including certain forms of the Fischer-Tropsch process, the original German synthol process, and in particular the modern hydrocarbon-synthesis process employing fluidized hydrogenation catalysts.

While our invention is broadly useful as set forth above, we have found it to be especially advantageous for processing the hydrocarbon phase resulting from the hydrogenation of carbon monoxide in the presence of fluidized, alkali-promoted iron catalysts. The hydrocarbon phase from such a process may contain up to 40 percent or more of organic oxygenated compounds of the types set forth below, when produced under the following conditions:

| | |
|---|---|
| Catalyst | Iron |
| Promoter | Potassium carbonate |
| Promoter concentration | 0.5–2.0 percent by weight |
| Temperature | 550–650° F. |
| Pressure | 100–500 lb./in.$^2$, gage |
| Space velocity | 4–20 cu. ft. CO, measured at 60° F. and 1 atmosphere, per pound of iron per hour |
| CO concentration in feed | 10–20 percent by volume |
| H$_2$:CO ratio in total feed | 1.5–6 |

The hydrocarbon phase obtained from such a process is a complex mixture comprising virtually the entire range of saturated and unsaturated hydrocarbons, from methane to high-melting waxes, and a wide range of organic oxygenated compounds, including aliphatic aldehydes, aliphatic alcohols, aliphatic ketones, alkanoic acids, and phenols. The organic oxygenated compounds are predominantly of the oil-soluble type, but a substantial proportion of the more water-soluble homologues are also present. The following organic oxygenated compounds, and others, have been shown to be present in such reaction products: acetaldehyde, propionaldehyde, butyraldehyde, isobutyraldehyde, and higher aliphatic aldehydes; acetone, methyl ethyl ketone, methyl n-propyl ketone, methyl n-butyl ketone, and higher aliphatic ketones; methanol, ethanol, n-propyl alcohol, n-butyl alcohol, isobutyl alcohol, n-pentyl alcohol, n-octyl alcohol, and higher aliphatic alcohols; acetic acid, propionic acid, butyric acid, 2-methylbutyric acid, valeric acid, 3-methylvaleric acid, 2-methylhexanoic acid, caprylic acid, capric acid, myristic acid, palmitic acid, stearic acid, and other aliphatic carboxylic acids; esters derivable from the foregoing alcohols and acids, such as methyl acetate, ethyl acetate, ethyl butyrate, and the like; formals, acetals, and ketals derivable from the foregoing aldehydes, ketones, and alcohols; and phenol and higher phenols.

It is known that organic oxygenated compounds of the group consisting of alcohols, aldehydes, and ketones may be separated from hydrocarbon solutions thereof by extraction with an aqueous solution of a salt of an organic acid, preferably a carboxylic acid containing less than twelve carbon atoms in the molecule, and the extraction is carried out most effectively with an extractant solution containing in excess of about 30 percent by weight of carboxylic-acid salts. The more concentrated extractant solutions, however, also dissolve a substantial quantity of hydrocarbons, and the proportion of hydrocarbons to organic oxygenated compounds in the resulting aqueous extract becomes progressively greater in direct proportion to a function of the solubilizer concentration. For example, when the extraction is carried out with an aqueous solution containing 50 to 60 percent by weight of solubilizer, and the operating conditions during the extraction are adjusted so that around 90 percent by volume of the organic oxygenated compounds are removed from the charging stock, the volume of hydrocarbons simultaneously removed may even be somewhat greater than the volume of extracted organic oxygenated compounds. The resulting mixture of organic oxygenated compounds and hydrocarbons, when separated from the aqueous extract, has a greatly improved ratio of organic oxygenated compounds to hydrocarbons, compared with the ratio in the charging stock; however, since the hydrocarbons have boiling points throughout the entire range of the organic oxygenated compounds, the further separation and purification of the organic oxygenated compounds obviously cannot be effected in a convenient manner by fractional distillation or other conventional means.

We have now devised a novel combination process having the advantage of producing a high extraction efficiency without the disadvantage of excessive hydrocarbon contamination of the extract. In a simple embodiment of our invention, a charging stock comprising an organic oxygenated compound and a hydrocarbon is countercurrently contacted with an aqueous extractant solution containing less than 30 percent by weight of the defined class of solubilizer salts, and a first aqueous extract is withdrawn containing the principal product fraction, consisting of the organic oxygenated compound with only a small proportion of hydrocarbon contaminant. The resulting hydrocarbon raffinate, still containing a substantial proportion of the organic oxygenated compound, is thereafter countercurrently contacted with an aqueous extractant solution containing in excess of 30 percent by weight of the defined class of solubilizer salts, and a second aqueous extract is withdrawn containing the organic oxygenated compound, heavily contaminated with hydrocarbon. This mixture of organic oxygenated compound and hydrocarbon, when stripped from the second aqueous extract, may suitably be recycled to the first extraction stage. The second hydrocarbon raffinate contains comparatively little of the organic oxygenated compound.

One object of our invention is to effect the separation and recovery of organic oxygenated compounds from admixture with hydrocarbons. Another object of our invention is to provide a process for recovering organic oxygenated compounds, such as alcohols, aldehydes, ketones, carboxylic acids, and phenolic compounds, from hydrocarbon solutions thereof, such as hydrocarbon solutions resulting from the oxidation of hydrocarbon gases, or from the hydrogenation of oxides of carbon, in particular carbon monoxide. A further object of our invention is to provide a method for effecting the substantially complete extraction of organic oxygenated compounds from hydrocarbon solutions thereof and for producing an aqueous extract containing said organic oxygenated compounds with a minimum proportion of contaminating hydrocarbons. An additional object of our invention is to produce a hydrocarbon product relatively free of oxygenated compounds, and a subsidiary object is to produce a motor fuel of relatively good odor and of improved stability with respect to antiknock rating. Other objects of our invention, and its advantages over the prior art, will be apparent from the following description.

Figure 1 illustrates the elements of our invention. A charging stock containing organic oxygenated compounds and hydrocarbons, suitably prepared by hydrogenating carbon monoxide in the presence of a fluidized, alkali-promoted iron catalyst as described above, is introduced through line 101 into the bottom of extraction column 102, where it flows upward countercurrent to an aqueous extractant stream, introduced into the top of the column through line 103. The aqueous extractant stream contains less than 30 percent by weight, preferably between about 5 and 20 percent, of water-soluble salts of carboxylic acids, suitably a mixture of acids of the type contained in the charging stock. Such an extractant stream ordinarily dissolves between about 50 and 75 percent of the organic oxygenated compounds contained in the charging stock during a contact time of less than five minutes, while simultaneously dissolving only a small quantity of hydrocarbons. The resulting aqueous extract flows out of the bottom of extraction column 102 through line 104 and is transferred by pump 105 through heater 106 into an intermediate section of stripper 107. Therein, the organic oxygenated compounds and any contaminating hydrocarbons are stripped out by the action of reboiler 108, and are led, in combination with a quantity of water, from the top of the stripper through condenser 109 into separator 110, where stratification takes place. The aqueous phase in separator 110 is refluxed to the top of the stripper through valved line 111, and the organic phase, comprising predominantly organic oxygenated compounds, is withdrawn through valved line 112 to storage or to further processing, suitably to isolate the individual components thereof. The stripped extractant stream, now substantially depleted of organic oxygenated compounds, flows out of the bottom of stripper 107 through line 113, and may thereafter be cooled and recycled, suitably through line 103 to the top of extraction column 102.

A hydrocarbon stream containing a diminished proportion of organic oxygenated compounds emerges from the top of extraction column 102 through line 114, and is transferred by pump 115 into the bottom of extraction column 116, where it is counter currently contacted with a more concentrated aqueous extractant solution, containing in excess of 30 percent by weight, preferably between about 40 and 60 percent, of water-soluble salts of carboxylic acids, as defined above, introduced into the top of the extraction column through line 117. Most of the organic oxygenated compounds in the hydrocarbon stream entering the bottom of extracting column 116 are extracated by the aqueous solution, and a hydrocarbon raffinate containing only a minor proportion of organic oxygenated compounds emerges from the top of extraction column 116 through line 118. This material is withdrawn to storage or to further processing, suitably by fractional distillation, isoforming, or the like.

An aqueous extract containing the organic oxygenated compounds and a substantial proportion of dissolved hydrocarbons flows out of the bottom of extraction column 118 through line 119 and is transferred by pump 120 through heater 121 into an intermediate point of stripper 122, equipped with reboiler 123. The organic oxygenated compounds, hydrocarbons, and a quantity of water are distilled overhead from the stripper through condenser 124 into separator 125, where they form two phases. The aqueous phase from the separator is refluxed to the top of stripper 122 through valved line 126, and the organic phase, containing predominantly the organic oxygenated compounds and contaminating hydrocarbons, is withdrawn through valved line 127 to further processing, preferably being recycled with the original charging stock through line 101 to the bottom of extraction column 102. The depleted aqueous extractant stream emerging from the bottom of stripper 122 through line 128 is substantially free from organic oxygenated compounds, and after being cooled may be recycled to the top of extraction column 116 through line 117.

For use as solubilizers in the aqueous extractant solutions employed in our process, water-soluble salts of carboxylic acids in general are suitable, such as alkanoates, cycloalkanecarboxylates, benzenecarboxylates or other aromatic carboxylates, and heterocyclic carboxylates, of alkali metals, in particular sodium and potassium, or of ammonium or substituted ammoniums. Such salts are to be understood as including both the so-called fatty-acid soaps and the comparatively non-surface-active carboxylic-acid salts. We prefer, however, to use extractant solutions comprising a salt of an alkanoic acid containing less than twelve carbon atoms in the molecule, since such salts are substantially non-surface-active and show little or no tendency to form emulsions under the conditions employed in our process, in contrast to the fatty-acid soaps, such as sodium oleate and sodium stearate. It is unnecessary to exclude surface-active soaps entirely from the aqueous extractant solutions in order to avoid emulsification difficulties, but where a mixture of solubilizer salts is used, they should comprise predominantly the non-surface-active types as defined above, and should preferably contain around 75 percent or more of such non-surface-active types. The salts of various mixtures of organic acids are distinctly superior to salts of single acids; and it is especially advantageous to use salts of the organic acids, including carboxylic acids and phenols, produced by the hydrogenation of carbon monoxide in the prior-art processes. Such mixtures ordinarily consist predominantly of alkanoates, and have an average of less than eleven carbon atoms in the molecule.

The class of substantially non-surface-active carboxylic-acid salts that we prefer to use in the extractant solutions of our process are to be understood as including alkanoates such as acetates, propionates, valerates, caproates, undecanoates, and the like, of the alkali-metals, in particular sodium and potassium, and of ammonium and substituted ammoniums; alkenoates such as acrylates, crotonates, isocrotonates, and the like; alkanedioates such as malonates, adipates, azelates, sebacates, and the like; alkenedioates such as maleates, fumarates, and the like; cycloalkanecarboxylates such as cyclopentanecarboxylates, cyclohexanecarboxylates, and the like; and arylcarboxylates such as benzoates, phthalates, and the like.

Our extractant solutions may also include one or more inorganic salts, such as the chloride, bromide, sulfate, phosphate, nitrate, or the like, of a cation chosen from the group set forth above. The concentration of such salt may suitably be up to the level required to saturate the aqueous extractant solution.

In the first extraction step of our process, employing a relatively dilute extractant solution, the concentration of solubilizer therein should be less than 30 percent by weight, and preferably between about 5 and 20 percent. In the second extraction step of our process, employing a relatively concentrated extractant solution, the concentration of solubilizer should be above 30 percent by weight, and preferably between about 40 and 60 percent by weight, although higher concentrations may be used where the extraction conditions are such that the extractant solution is maintained in the liquid phase.

The temperatures and pressures employed in the extraction steps of our process are not critical. We may carry out the extractions at temperatures from somewhat below room temperature to as high as 100° C. or above, and at reduced, ordinary, or elevated pressures, so long as the extractant solutions and the charging stocks remain liquid under the process conditions. Ordinarily, however, we prefer to operate at temperatures between about 20 and 50° C., and at atmospheric or autogenous pressures.

Figure 2 illustrates an advantageous embodiment of our invention employing a number of separation, recycle, and recovery features.

A charging stock containing organic oxygenated compounds and hydrocarbons is introduced by pump 201 through line 202 into the bottom of extraction column 203, where it is countercurrently contacted with a dilute aqueous extractant solution, introduced into the top of the column through line 204, containing preferably between about 5 and 20 percent by weight of solubilizer salts, as defined above, and a sufficient quantity of a free base such as sodium hydroxide, introduced into line 204 through line 205, to react with substantially all of the organic acids contained in the charging stock. The greater portion of the organic acids and organic oxygenated compounds are dissolved by the extractant solution as it flows downward through the column.

The resulting extract flows out of the bottom of column 203 through line 206 and is transferred by pump 207 through heater 208 into an intermediate section of stripper 209. Within the stripper, reboiler 210 distills out the organic oxygenated compounds and a quantity of water. The distillate passes from the top of the column through condenser 211 into separator 212, where two phases are formed. The aqueous phase from separator 212 is refluxed to the top of stripper 209 through valved line 213, and the organic phase, comprising predominantly organic oxygenated compounds, is taken off through valved line 214 to storage or further processing. The stripped extractant solution flowing from the bottom of stripper 209 passes through cooler 215 and is divided into two streams. One stream, containing organic-acid salts equivalent in amount to the organic acids present in the charging stock, is withdrawn through valved line 216 for liberation and recovery of the organic acids by conventional methods. The other stream flows through valved line 217 and is recycled by pump 218 through line 204 to the top of extraction column 203.

From the top of extraction column 203 through line 219 flows a hydrocarbon stream containing a diminished proportion of organic oxygenated compounds. This stream is transferred by pump 220 into the bottom of extraction column 221, where it is countercurrently contacted with an aqueous extractant solutions, supplied as described below, preferably containing between about 40 and 60 percent by weight of the defined class of solubilizer salts. Most of the organic oxygenated compounds remaining in the hydrocarbon stream are extracted thereby, and a hydrocarbon raffinate containing only a small proportion of organic oxygenated compounds flows out of the top of extraction column 221 through line 222 to storage or further processing.

An aqueous extract containing organic oxygenated compounds contaminated with a substantial proportion of hydrocarbons flows from the bottom of extraction column 221 through line 223, and is thereafter subjected to a differential heat treatment, according to the following procedure, for the selective separation of the dissolved components thereof, other than the solubilizer salts. The aqueous extract in line 223 is transferred by pump 224 through heater 225 into hot separator 226, where stratification takes place at a temperature above about 60° C. The resulting organic phase, comprising most of the hydrocarbons and a substantial proportion of the organic oxygenated compounds, is withdrawn through valved line 227 and line 228 and is recycled to the bottom of extraction column 203 by pump 229 through line 230, pump 201, and line 202. The aqueous phase from hot separator 226, containing a relatively small proportion of dissolved materials, other than the solubilizer salts, is taken off through line 231 and divided into two streams. One stream flows through valve 232 and is transferred by pump 233 through cooler 234 into an intermediate section of extraction column 221, where the proportion of organic oxygenated compounds in the stream is equal to or less than the proportion in the aqueous extractant stream reaching the same section during the passage of the latter downward through extraction column 221. The remainder of the aqueous phase from hot separator 226 flows through valve 235 and is transferred by pump 236 through heater 237 into an intermediate section of stripper 238, equipped with reboiler 239. This stream is subjected to an exhaustive stripping operation, whereby substantially all organic oxygenated compounds and hydrocarbons, together with a quantity of water, are removed and distilled overhead through condenser 240 into separator 241, where the distillate stratifies. The aqueous phase from separator 241 is returned to the top of stripper 238 through valved line 242, and the organic phase, comprising organic oxygenated compounds and hydrocarbons, is withdrawn through valved line 243 and line 228, and is recycled to the bottom of the initial extraction column 203 by pump 229 through line 230, pump 201 and line 202. A clean, highly purified aqueous extractant solution flows out of the bottom of stripper 238 through cooler 244, and is introduced by pump 245 through line 246 to the top of extraction column 221. This stream is especially effective, owing to its freedom from organic oxygenated compounds, for extracting a maximum proportion of the organic oxygenated compounds from the hydrocarbon stream entering the bottom of extraction column 221.

The advantages of our invention will be more fully understood from the following specific example:

Example

The following example illustrates the separation of organic oxygenated compounds from an organic phase comprised thereof with hydrocarbons, resulting from the hydrogenation of carbon monoxide in the presence of a fluidized, alkali-promoted iron catalyst. The crude organic phase was subjected to a preliminary scrubbing with a dilute solution of sodium hydroxide to remove most of the carboxylic acids and phenolic compounds therefrom, and the scrubbed organic phase was found to have the following composition:

| | |
|---|---|
| Acids | 0.005 N |
| Alcohols | 0.802 moles/liter |
| Total carbonyl compounds | 0.572 moles/liter |
| Aldehydes | 0.438 moles/liter |
| Hydrocarbons | 78 vol. percent |

Two aqueous extractant solutions containing 20 and 50 percent by weight of sodium organic-acid salts were prepared by commingling aqueous sodium hydroxide with a mixture of carboxylic acids, isolated from the wash liquor obtained in the preliminary caustic scrubbing, as described above, of a similar organic phase, and having a specific gravity (20/4° C.) of 0.9409 and an average molecular weight of 169.4.

Three liters of the caustic-washed organic phase were extracted five times at room temperature with successive 500-milliliter portions of the aqueous 20 percent by weight extractant solution, having an initial pH of 8.99, and the resulting aqueous extracts were individually steam distilled to separate therefrom the dissolved organic materials, other than the organic-acid salts. The results were as follows:

| Extraction No. | Aqueous Extract Phase | Distillate Organic Phase | Raffinate |
|---|---|---|---|
| | Ml. | Ml. | Ml. |
| 1 | 577 | 71 | |
| 2 | 574 | 60 | |
| 3 | 562 | 54 | |
| 4 | 550 | 38 | |
| 5 | 538 | 33 | |
| | | *44 | |
| Total | | | |
| Final | | 300 | 2,645 |

The organic phase marked with an asterisk in the above table was obtained by combining and steam-stripping all of the distillate aqueous phases that had been obtained in the steam distillation of the various aqueous extract phases.

The final raffinate and the combined distillate organic phases were analyzed, with the following results:

| | Raffinate | Combined Distillate Organic Phases |
|---|---|---|
| Acids, N | Nil | 0.006 |
| Alcohols, moles/liter | 0.231 | 4.73 |
| Total carbonyl compounds, moles/liter | 0.429 | 1.32 |
| Aldehydes, moles/liter | 0.170 | 0.30 |
| Hydrocarbons, volume percent | >77 | 36 |

Subsequently, 2545 milliliters of the final raffinate from the treatment with 20 percent extractant solution were extracted at room temperature with five successive 500-milliliter portions of the aqueous 50 percent extractant solution, and the resulting aqueous extracts were steam distilled as before. The results were as follows:

| Extraction No. | Aqueous Extract Phase | Distillate Organic Phase | Raffinate |
|---|---|---|---|
| | Ml. | Ml. | Ml. |
| 1 | 700 | 172 | |
| 2 | 630 | 93 | |
| 3 | 580 | 73 | |
| 4 | 570 | 67 | |
| 5 | 560 | 54 | |
| | | *19 | |
| Total | | 478 | |
| Final | | | 2,038 |

The final raffinate and the combined distillate organic phases were analyzed, with the following results:

| | Raffinate | Combined Distillate Organic Phases |
|---|---|---|
| Acids, N | Nil | 0.02 |
| Alcohols, moles/liter | 0.053 | 1.76 |
| Total carbonyl compounds, moles/liter | 0.311 | 0.65 |
| Aldehydes, moles/liter | 0.122 | 0.43 |
| Hydrocarbons, volume per cent | >80 | 59 |

It will be apparent that numerous modifications may be made in the details of our process without departing from the spirit thereof, as defined in the description and the claims. Our process is applicable broadly to the processing of mixtures of hydrocarbons and organic oxygenated compounds, utilizing aqueous solutions of our defined class of solubilizer salts, and it is to be understood that our invention contemplates the utilization of any of the various types of apparatus and equipment available for effecting the extraction, scrubbing, washing, stripping, fractionating, and other unit operations used or useful in our process, together with control instruments and equipment therefor. It will be apparent, moreover, that while we prefer to effect the various operations of our process in a continuous manner, we may also operate batchwise or semicontinuously. While the foregoing flowsheets and the descriptions thereof illustrate advantageous embodiments of our invention, it is to be understood that we are not limited to the charging stocks, process materials, apparatus and arrangement thereof, and manipulative steps described therein. In general, it may be said that any modifications or equivalents that would ordinarily occur to those skilled in the art are to be considered as lying within the scope of our invention.

In accordance with the foregoing description, we claim as our invention:

1. In a process for separating a preferentially oil-soluble organic oxygenated compound selected from the group consisting of alcohols, aldehydes, and ketones from a solution thereof comprising predominantly hydrocarbons, the steps which comprise contacting said hydrocarbon solution with a first aqueous extractant solution containing less than 30 percent by weight of a substantially non-surface-active salt of a preferentially oil-soluble carboxylic acid, withdrawing an aqueous extract containing said organic oxygenated compound and a hydrocarbon raffinate containing a diminished proportion of said organic oxygenated compound, and contacting said hydrocarbon raffinate with a second aqueous extractant solution containing above 30 percent by weight of a substantially non-surface-active salt of a preferentially oil-soluble carboxylic acid, whereby an additional quantity of said organic oxygenated compound is removed from said hydrocarbon raffinate.

2. The process of claim 1 wherein said first aqueous extractant solution contains between about 5 and 20 percent by weight of said salt.

3. The process of claim 1 wherein said second aqueous extractant solution contains between about 40 and 60 percent by weight of said salt.

4. The process of claim 1 wherein said substantially non-surface-active salt is a water-soluble salt of a preferentially oil-soluble aliphatic carboxylic acid.

5. The process of claim 4 wherein said salt is an alkali-metal alkanoate.

6. The process of claim 1 wherein said hydrocarbon solution and said hydrocarbon raffinate are contacted with said aqueous extractant solutions at temperatures between about 20 and 50° C.

7. The process of claim 1 wherein said aqueous extractant solutions contain a salt of a preferentially oil-soluble carboxylic acid having less than twelve carbon atoms in the molecule.

8. In a process for separating a preferentially oil-soluble organic oxygenated compound selected from the group consisting of alcohols, aldehydes, and ketones from a solution thereof comprising predominantly hydrocarbons, the steps which comprise contacting said hydrocarbon solution with an aqueous extractant solution containing less than 30 percent by weight of a solubilizer consisting essentially of salts of a mixture of preferentially oil-soluble carboxylic acids having an average of less than eleven carbon atoms in the molecule, withdrawing an aqueous extract containing said organic oxygenated compound and a hydrocarbon raffinate containing a diminished proportion of said organic oxygenated compound, and contacting said hydrocarbon raffinate with a second aqueous extractant solution containing above 30 percent by weight of said solubilizer, whereby an additional quantity of said organic oxygenated compound is removed from said hydrocarbon raffinate.

SCOTT W. WALKER.
JAMES E. LATTA.

REFERENCES CITED

The following references are of record in the file of this patent:

UNITED STATES PATENTS

| Number | Name | Date |
|---|---|---|
| 2,246,297 | Duncan et al. | June 17, 1941 |
| 2,274,373 | Lyman | Feb. 24, 1942 |
| 2,274,750 | Soenksen et al. | Mar. 3, 1942 |